United States Patent
Cardenas

[19]

[11] Patent Number: 5,996,329
[45] Date of Patent: Dec. 7, 1999

[54] MULTI-AXIS MACHINING HEAD

[76] Inventor: Curtis E. Cardenas, 49871 Miller Ct., New Baltimore, Mich. 48047

[21] Appl. No.: 09/079,733

[22] Filed: May 15, 1998

[51] Int. Cl.$^6$ .............................. B23Q 16/00; B23C 7/00
[52] U.S. Cl. ...................... 59/48.5 R; 409/201; 409/216; 409/230
[58] Field of Search ................... 29/56.5, 39, 40, 29/48.5 R, 48.5 A; 409/201, 211, 204, 216, 200, 230

[56] References Cited

U.S. PATENT DOCUMENTS

| | | | |
|---|---|---|---|
| 3,359,861 | 12/1967 | Johnson et al. | 409/211 |
| 3,823,644 | 7/1974 | Mello . | |
| 3,885,280 | 5/1975 | Berthiez | 29/26 R |
| 4,370,080 | 1/1983 | Goode | 409/200 |
| 4,478,540 | 10/1984 | Sachot | 409/211 |
| 4,635,329 | 1/1987 | Holy et al. | 29/27 C |
| 4,638,550 | 1/1987 | Malzkorn | 409/216 X |
| 4,657,453 | 4/1987 | Goulot et al. | 409/216 |
| 4,709,455 | 12/1987 | D'Andrea et al. | 409/216 |
| 4,709,465 | 12/1987 | Lewis et al. . | |
| 5,238,340 | 8/1993 | Ochiai et al. | 409/201 |
| 5,413,439 | 5/1995 | Wu et al. | 409/216 |
| 5,538,375 | 7/1996 | Kwapisz | 409/201 |
| 5,584,621 | 12/1996 | Bertsche et al. | 409/201 |
| 5,664,308 | 9/1997 | Deitert | 29/40 |
| 5,718,545 | 2/1998 | Husted | 409/201 |

FOREIGN PATENT DOCUMENTS

| | | |
|---|---|---|
| 241 382 A1 | 12/1986 | Germany . |
| 254 542 A1 | 3/1988 | Germany . |
| 58-171239 | 10/1983 | Japan . |
| 62-120956 | 6/1987 | Japan . |
| 1-22809 | 9/1989 | Japan . |
| 222809 | 9/1989 | Japan ..................... 409/201 |
| 774825 | 10/1980 | U.S.S.R. . |

OTHER PUBLICATIONS

Tri-Tech Precision Products, Inc., *5-Axis Machining Made Affordable*, Feb. 1997.
Fadal Engineering, *Vertical Machining Centers, Linear Way Series*, 1997, pp. 1–15.

*Primary Examiner*—William Briggs
*Attorney, Agent, or Firm*—Harness, Dickey & Pierce, P.L.C.

[57] ABSTRACT

The present invention provides a machining head attachment for a milling machine which is able to travel along five axes movement. The machining head attachment generally includes a driving spindle which is detachably connected to the milling machine, and a driven spindle operationally attached to the driving spindle. The driven spindle is able to selectively pivot about two axes of movement. As a result is able to be positioned at any point along a hemisphere.

6 Claims, 4 Drawing Sheets

MULTI-AXIS MACHINING HEAD

BACKGROUND OF THE INVENTION

I. Technical Field

The present invention relates generally to a machining head and, more particularly, to a machining head which can move along multiple axes to machine a work piece.

II. Discussion

To be competitive in manufacturing, manufacturers require that manufacturing equipment occupy a smaller amount of space and provide more versatile machining operations. Specifically, with manufacturing equipment such as vertical mills, manufacturers have an increased need that the vertical mills occupy a small amount of space and are able to machine a work piece in multiple directions along multiple surfaces without the need of refixturing.

A typical vertical mill is able to travel along three axes of movement. The mill is usually able to travel downward into the part (in the "Z" direction), horizontally across the part (in the "X" direction) and horizontally across the part (in the "Y" direction). Because of the vertical mill's ability to move along these axes, one surface of a work piece may be machined across its surface at varying depths in the X and Y directions. If a machinist desires to machine a different surface of the work piece, then the work piece must be physically refixtured such that the different surface faces upward toward the vertical mill. This limitation on versatility increases the amount of down time since the vertical mill must be shut down to refixture the work piece anytime a different surface is to be machined. This increase in down time increases the overall cost of the part.

Attempts have been made to automate the refixturing process. Devices such as indexers have been used to rotate a work piece and thereby reposition a new surface toward the vertical mill. Typical indexers usually clamp a work piece at one end and journal it at a second end. Because the work piece is fixtured at both ends, it is difficult if not impossible for the milling machine to perform any machining at these ends. Also, the indexer must be physically attached to the table of the vertical mill. Because the indexer requires space on the vertical mill table in excess of that required by the work piece, the amount of travel of the table, which governs the size limitations of the work piece which may be machined, is effectively reduced. As a result, the vertical mill requires more space to operate for a given work piece size when using an indexer. The present invention overcomes these drawbacks.

SUMMARY OF THE INVENTION

The present invention overcomes these drawbacks by providing a machining head attachment for a vertical mill which is able to travel along more than three axes of movement. The machining head attachment generally includes a driving spindle which is detachably connected to the milling machine, and a driven spindle operationally attached to the driving spindle. The driven spindle is able to selectively pivot about a first axis defined by where the driving spindle engages the driven spindle. By this way, the tip of the driven spindle opposite the point of engagement is able to swing along an arc. Because of this pivotal freedom of movement, the vertical mill is able to provide machining along a fourth axis of movement. In another aspect of the present invention, the driven spindle is supported in a driven spindle housing. The driven spindle housing is selectively rotatable about a second axis. Preferably, the second axis is defined by the rotational axis of the driving spindle. Because of the machining head's freedom of movement about this first and second axis, the end of the driven spindle opposite the pivot point is able to be positioned at any point along a hemisphere with its radial center at the pivot point. The result is the vertical mill being able to provide machining along fourth and fifth axes of movement. In another aspect of the present invention, the driven spindle or the driven spindle housing may be positioned by use of servo motors which are in electrical communication with a CNC controller.

Additional advantages and features of the present invention will become apparent from the subsequent description and the appended claims taken in conjunction with the accompanying drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENTS

Figure 1:
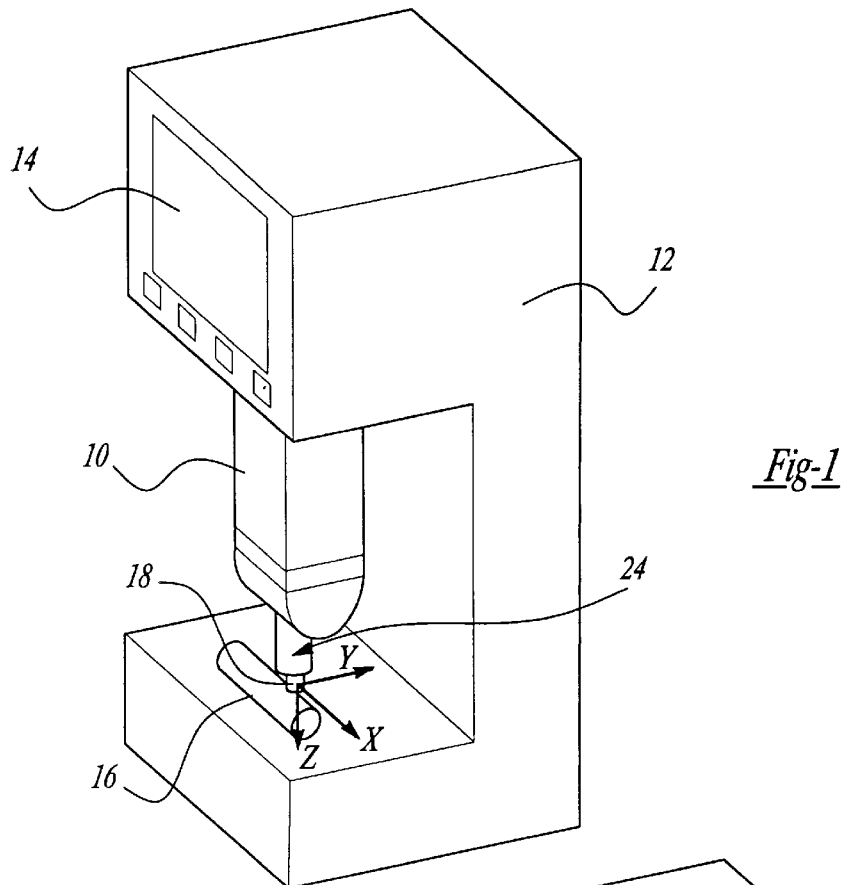
FIG. 1 is a perspective view of a multi-axis machining head being used by a milling machine according to the present invention.
Figure 2:
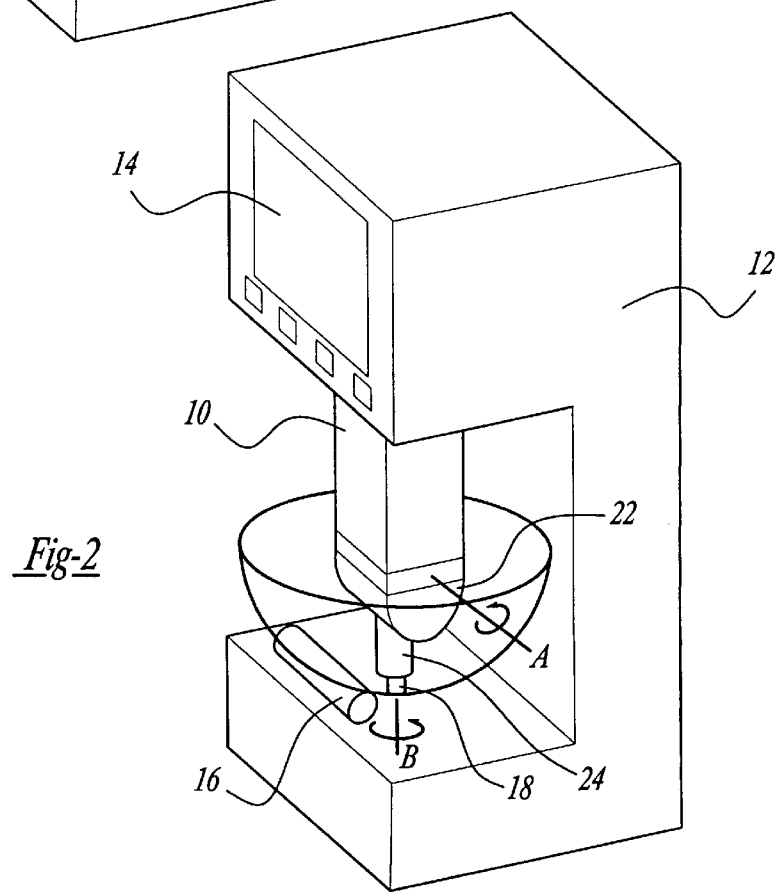
FIG. 2 is a perspective view of a multi-axis machining head being used by a milling machine according to the present invention.

With reference to FIGS. 1 and 2, the general operation of the present invention is illustrated. In FIG. 1, a multi-axis machining head 10 is shown attached to vertical mill 12 which is controlled by a computer numeric controller hereinafter referred to as CNC unit 14. Multi-axis machining head 10 is shown having driven spindle 24. In operation, the CNC unit 14 instructs the vertical mill 12 to move the multi-axis machining head 10 and thus driven spindle 24 downward in the Z direction to cause contact between work piece 16 and mill 18. Subsequently, the multi-axis machining head 10 may be moved in the X or Y direction to cause movement of driven spindle 24 and thus cause machining of work piece 16. As shown in FIG. 1, multi-axis machining head 10 has at least three axes of movement (X, Y, and Z).

Referring to FIG. 2, multi-axis machining head 10 is shown having two more axes of movement. Here, driven spindle 24 is able to rotate about axis A. Likewise, driven spindle housing 22, which supports driven spindle 24, is able to move about axis B. Since driven spindle housing 22 supports driven spindle 24 and is able to rotate about axis B, driven spindle 24 is able to move about axis B. Because driven spindle 24 is able to move about axis A and axis B, mill 18 may be positioned anywhere at a hemispherical position as shown. It can be seen from FIG. 1 and FIG. 2 that the ability of driven spindle 24 to move along 5 axes (X, Y, Z, A and B) allows vertical mill 12 to position mill 18 at many different locations on work piece 16.

Figure 3:
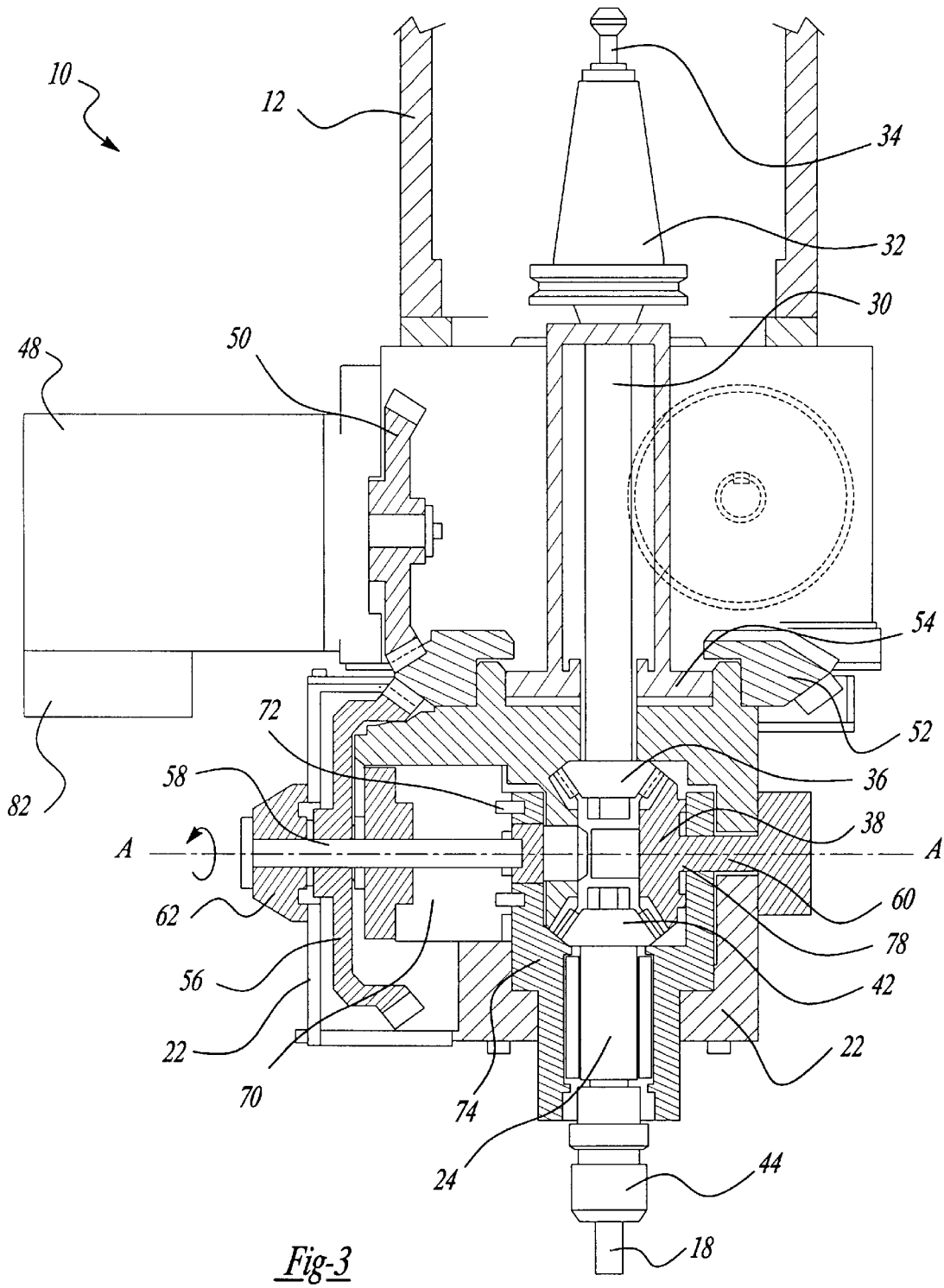
FIG. 3 is a cross sectional view of a multi-axis machining head according to the present invention.
Figure 4:
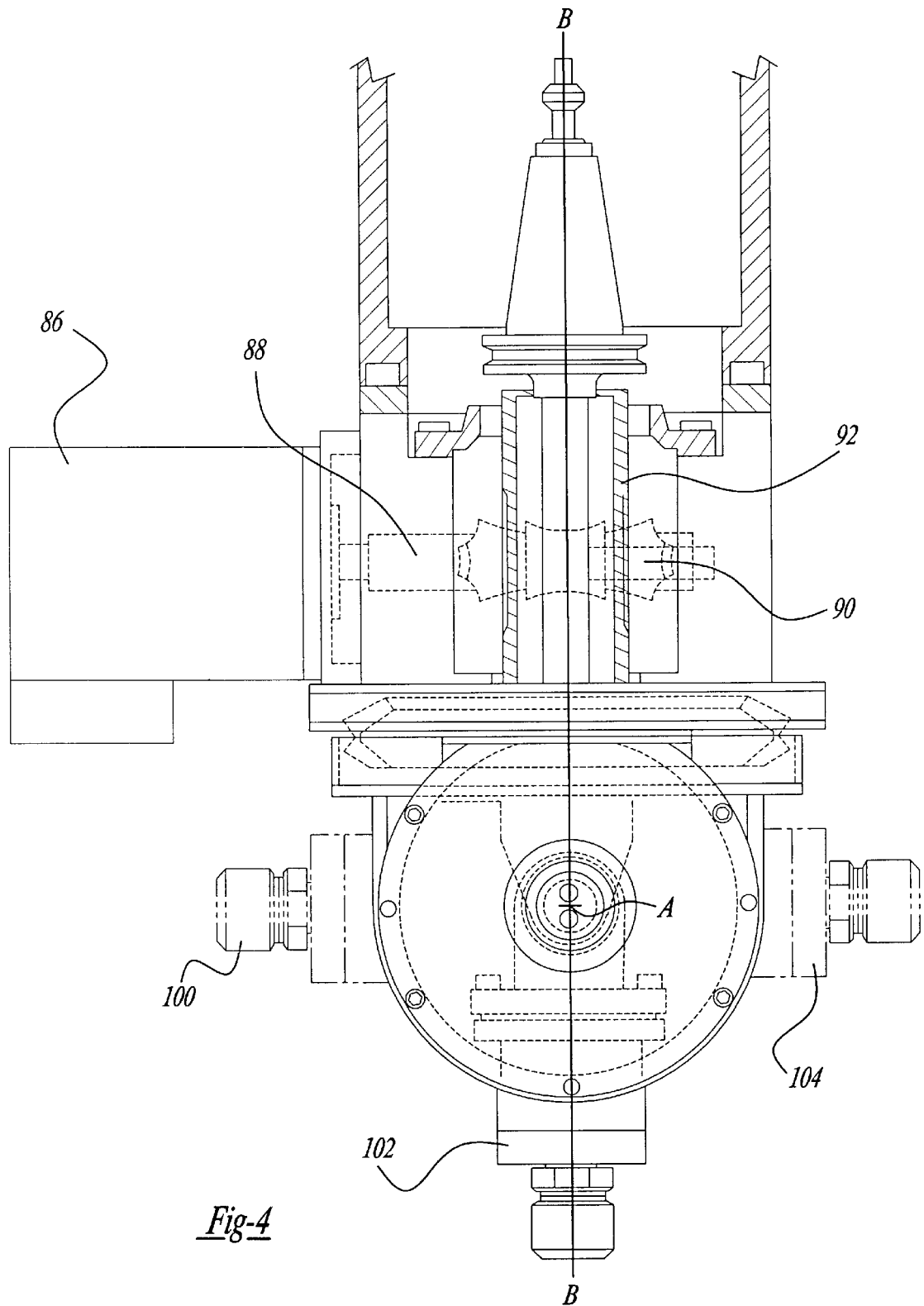
FIG. 4 is a cross sectional view of a multi-axis machining head according to the present invention.

Referring to FIGS. 3 and 4, the present invention is now described. In FIG. 3, a cross-sectional front view of a multi-axis machining head 10 shows the components which provide rotational motion from the vertical mill 12 to the mill 18. In FIG. 3, driving spindle 30 has tapered collet 32 and retention knob 34 at a first end, and driving bevel gear 36 attached at a second end. Driving bevel gear 36 is meshed with idler bevel gear 38. Idler bevel gear 38, in turn, is meshed with driven bevel gear 42. Like driving spindle 30, driven spindle 24 has driven bevel gear 42 attached at one end and mill collet 44 attached to the other. Mill collet 44 maintains attachment of mill 18 with driven spindle 24.

Again in FIG. 3, the components which provide movement of driven spindle 24 about the A axis are shown. Servo motor 48 is either splined or keyed to servo gear 50. Servo motor 48 electrically communicates with CNC unit 14 (see FIG. 1) at electrical connection 82. Servo gear 50 is, in turn, meshed with servo idler gear 52. Servo idler gear 52 is journaled about plate 54 and is meshed with servo driven gear 56. Servo driven gear 56 is supported by and lockingly engaged to shaft 58 which is, in turn, supported by journal area 62 and U-shaped bracket is 74 at a second end (to be discussed). Shaft 58 serves as a rotational input to speed reducer 70. Output bolts 72 of speed reducer 70 attach speed reducer 70 to U-shaped bracket 74 of driven spindle 24. U-shaped bracket 74 is, in turn, journalled about shaft 60 which supports idler bevel gear 38. Since the entire body of speed reducer 70 rotates in response to rotation of the input shaft 58, it is understood that the rotation of the body of speed reducer 70 rotates output bolts 72 and thus U-shaped bracket 74. It is noted that speed reducer 70 preferably has a ratio of 60:1(input to output). However, any ratio of speed reduction or no speed reduction at all may be used. It is noted that input shaft 58 and speed reducer 70 are only journalled at journal area 62 and U-shaped bracket 74 is journalled only by driven spindle housing 22. However, because output bolts 72 attach speed reducer 70 to U-shaped bracket 74, this attachment effectively joins each of these components forming one effective shaft journaled by driven spindle housing 22 and journal area 62.

In FIG. 4, the components which provide movement of driven spindle 24 about the B axis are illustrated. Servo motor 86 drives worm 88 which is, in turn, meshed with worm gear 90. Worm gear 90 is attached to sleeve 92 by press fit, weld or any other suitable means. As shown in FIG. 3, sleeve 92 is attached to plate 54. Plate 54 is, in turn, attached to driven spindle housing 22. As will be discussed, driven spindle housing 22 and all the components it contains is able to rotate about driving spindle 30.

Referring to FIGS. 2, 3 and 4, the operation of the present invention will now be described. Referring to FIG. 2, mill 18 and thus driven spindle 24 may be positioned at any point along a hemisphere as shown. This positioning is accomplished by a combination of rotational movements by multi-axis machining head 10 about axis A and axis B. With reference to FIG. 3, when movement about axis A is desired, CNC unit 14 instructs servo motor 48 through electrical connection 82 to move servo gear 50 through a predetermined angular displacement. This rotation of servo gear 50 causes rotation of servo idler gear 52 and thus servo driven gear 56. The rotation of servo driven gear 56 provides an input rotation to speed reducer 70. Speed reducer 70 reduces the rotational velocity, preferably by a factor of 60:1, which is output to U-shaped bracket 74 of driven spindle 24. Thus, driven spindle 24 pivots about shaft 78. This allows angular repositioning of driven spindle 24 about the A axis.

As shown in FIG. 4, driven spindle 24 is shown at three different angular positions 100, 102 and 104. When an operator desires traditional vertical milling, driven spindle 24 is moved to position 102, as shown, by the process as discussed above. Likewise, when an operator desires to approach a work piece from the side, driven spindle 24 may be moved to either position 100 or 104 by the process as discussed above.

Referring to FIG. 4, when movement about the B axis is desired, CNC unit 14 instructs servo motor 86 to cause a predetermined angular rotation of worm 88. This predetermined rotation causes rotation of worm gear 90 which, in turn, causes rotation of sleeve 92. The rotation of sleeve 92 causes rotation of plate 54 which results in rotation of driven spindle housing 22 about driving spindle 30. Thus, although idler bevel gear 38 and driven bevel gear 42 maintain a fixed spatial relationship, idler bevel gear 38 rolls around driving bevel gear 36 while staying in a meshing engagement therewith.

By combining the movement of driven spindle 24 about the A and B axes with the movement along the X, Y and Z axes, it is understood that driven spindle 24 and mill 18 may be positioned to accommodate many different work piece machining requirements without burdening the vertical mill table with encumbrances such as indexers. This and other accomplishments are obtained through the use of this invention.

Figure 5:
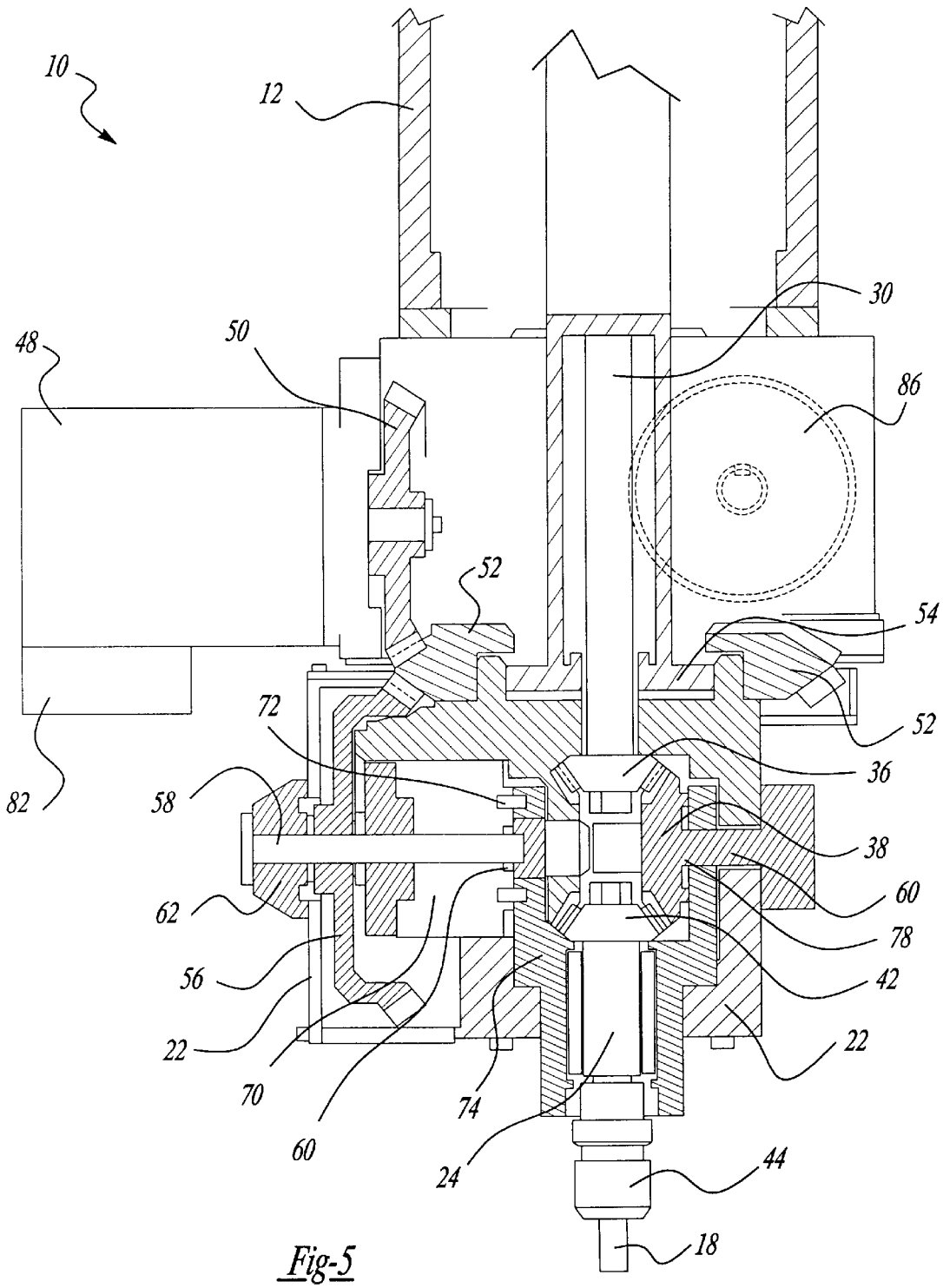
FIG. 5 is a cross sectional view of a multi-axis machining head according to the present invention.

With reference to FIG. 5, a second embodiment of the present invention is shown. Here, tapered collet 32 and retention knob 34 is eliminated and driving spindle 30 is permanently attached to vertical mill 12. The remaining components of multi-axis machining head 10 operate as discussed above. Thus, it is understood that, in this embodiment, multi-axis machining head 10 is not selectively detachable from vertical mill 12.

While the above detailed description described the preferred embodiment of the present invention, it should be understood that the present invention is susceptible to modification, variation, and alteration without deviating from the scope and fair meaning of the subadjoined claims.

What is claimed is:

1. A machining head attachment for a milling machine, said machining head attachment comprising:

an attachment housing having a surface for mating with a complimentary surface formed on said milling machine;

a driving spindle supported within the attachment housing, said driving spindle having a first end and a second end, said first end of said driving spindle being tapered and having a retention knob for detachable connection to said milling machine, said driving spindle operationally engaged with a gear train at said second end;

a driven spindle having a first end and a second end, said first end of said driven spindle being operationally engaged with said gear train, said gear train transferring rotational energy from said driving spindle to said driven spindle, said driven spindle rotating in response to rotation by said driving spindle, said gear train allowing angular movement of said driven spindle about a first axis while transferring said rotational energy from said driving spindle to said driven spindle, said first axis intersecting said gear train and being nonparallel with a second axis, said second axis defined by an axis of rotation of said driving spindle;

a driven spindle housing supporting said driven spindle, said driven spindle housing rotatably mounted around said driving spindle to allow rotation of said spindle housing about said second axis, said first axis and said second axis positioned to allow said second end of said driven spindle to be positioned at any point along a hemispherical path;

a spindle servo motor secured to said attachment housing;

a spindle angle gear train connected to said spindle servo motor, said spindle angle gear train including:

a first bevel gear splined to a drive shaft of said spindle servo motor;

a second bevel gear positioned perpendicular to and meshingly engaged with said first bevel gear, said second bevel gear having an axis of rotation parallel with said second axis, and said first bevel gear being orthogonal to said second bevel gear; and a third bevel gear having an axis of rotation parallel to said first bevel gear, said third bevel gear meshingly engaged with said second bevel gear, said third bevel gear being mechanically coupled to a yoke supported within said driven spindle housing for moving said yoke and said driven spindle about said first axis, said spindle servo motor selectively transferring rotational energy through said spindle angle gear train for moving said driven spindle from a first position to a second position about said first axis;

a housing servo motor secured to said attachment housing; and a spindle position gear train connected to said housing servo motor, said housing servo motor selectively transferring rotational energy through said spindle position gear train for moving said driven spindle housing and said driven spindle through a range of arcuate positions;

wherein said attachment housing, said spindle servo motor and said housing servo motor may be attached and detached from said milling machine as a unitary assembly upon disengaging said retention knob.

2. The machining head attachment as claimed in claim 1, wherein said milling machine is controlled by a computer numeric control, said spindle servo motor selectively moving said driven spindle in response to a spindle signal from said computer numeric control.

3. The machining head attachment as claimed in claim 1, wherein said spindle angle gear train further comprises a spindle speed reducer, said spindle speed reducer reducing the rotational velocity supplied from said spindle servo motor to said driven spindle.

4. The machining head attachment as claimed in claim 1, wherein said spindle position gear train comprises:

a worm shaft rotationally engaged to said housing servo motor;

a vertical sleeve positioned about said driving spindle, said vertical sleeve having an axis of rotation parallel to said second axis, and said vertical sleeve being journally supported within the attachment housing such that the vertical sleeve may rotate within the attachment housing and rotate independently from said driving spindle;

a worm gear positioned around and rotationally engaged to said vertical sleeve, said worm gear meshingly engaged with said worm shaft; and said vertical sleeve connected to said driven spindle housing to rotate said driven spindle housing and said yoke about said second axis.

5. The machining head attachment of claim 3 wherein said yoke further comprises first and second support members, said first support member being journally supported by a shaft formed on said driven spindle housing, and said second support member being connected to said spindle speed reducer.

6. The machining head attachment as claimed in claim 1, wherein said milling machine is controlled by a computer numeric control, said housing servo motor selectively moving said driven spindle housing in response to a housing signal from said computer numeric control.

* * * * *